B. O. RHODES.
UNIVERSAL JOINT.
APPLICATION FILED APR. 30, 1917.
1,264,976.
Patented May 7, 1918.
2 SHEETS—SHEET 2.
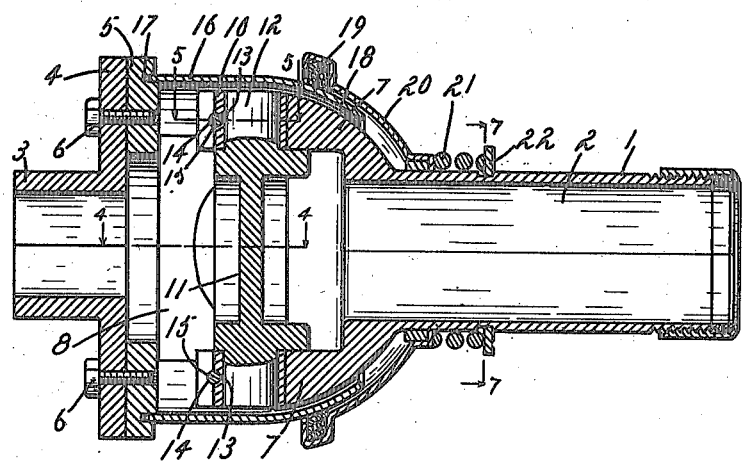
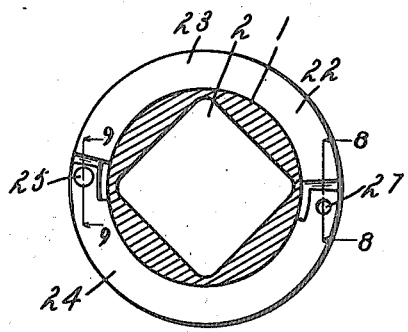
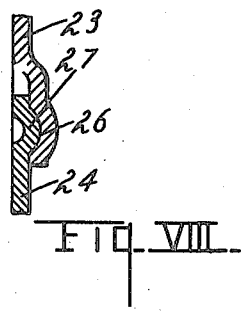
Inventor
Bert O. Rhodes
Witnesses
Luther Blake
By Chappell & Earl
Attorneys

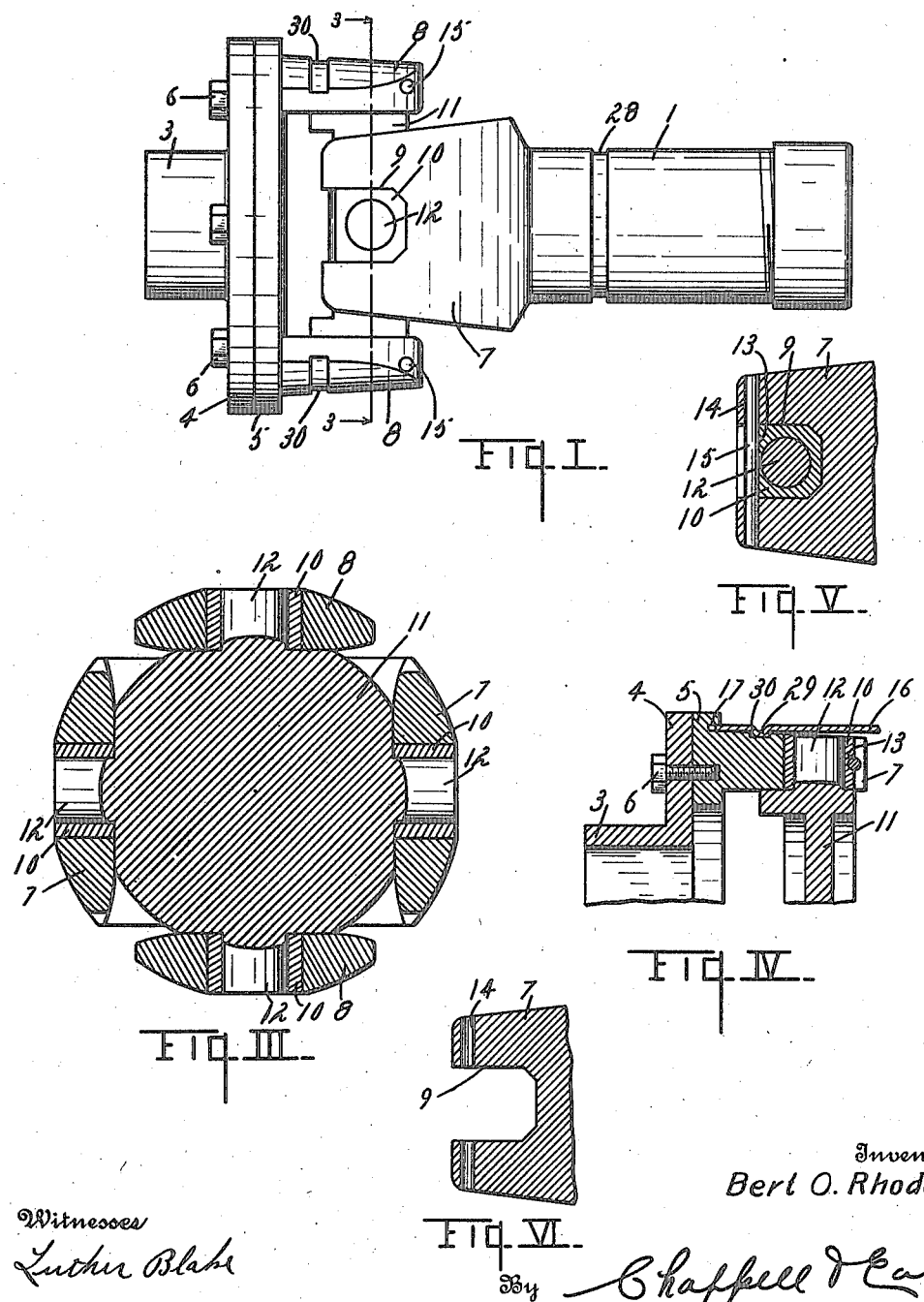

UNITED STATES PATENT OFFICE.

BERT O. RHODES, OF KALAMAZOO, MICHIGAN, ASSIGNOR TO ACME UNIVERSAL JOINT MANUFACTURING CO., OF KALAMAZOO, MICHIGAN.

UNIVERSAL JOINT.

1,264,976.  Specification of Letters Patent.  Patented May 7, 1918.

Application filed April 30, 1917. Serial No. 165,391.

*To all whom it may concern:*

Be it known that I, BERT O. RHODES, a citizen of the United States, residing in the city and county of Kalamazoo, State of Michigan, have invented certain new and useful Improvements in Universal Joints, of which the following is a specification.

This invention relates to improvements in universal joints.

The main objects of the invention are:

First, to provide an improved universal joint in which the parts are simple and economical to produce and very conveniently assembled and disassembled as occasion requires.

Second, to provide an improved universal joint in which journals are provided with bushings, the bushings and their seats conformed so that the bushings are held against rotative movement.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is an elevation of my improved joint with the casing removed.

Fig. II is a central longitudinal section with the casing in place, the journals being shown in full lines.

Fig. III is a transverse section on a line corresponding to line 3—3 of Fig. I.

Fig. IV is an enlarged detail section on a line corresponding to line 4—4 of Fig. II, showing details of the casing mounting.

Fig. V is a detail section on a line corresponding to line 5—5 of Fig. II, showing details of the bushing seats and bushings.

Fig. VI is a similar detail section with the bushings omitted.

Fig. VII is a transverse section on a line corresponding to line 7—7 of Fig. II, showing details of the housing cap supporting ring.

Fig. VIII is a detail section on a line corresponding to line 8—8 of Fig. VII, showing further details of the retaining ring.

Fig. IX is a detail section on a line corresponding to line 9—9 of Fig. VII, showing still further details of the retaining ring.

In the drawing similar reference characters refer to similar parts throughout the several views, and the sectional views are taken looking in the direction of the little arrows at the ends of the section lines.

Referring to the drawing, the shaft member 1 has a squared socket 2 adapted to receive one of the shaft sections. The shaft member 3 is formed of a shaft coupling member 4 and a forked section 5 having disk-like portions disposed side by side and secured together by screws 6. The shaft member 1 is provided with a fork or arms 7, while the shaft member 3 has a similar fork or arms 8. These arms have bushing seats 9 extending from their inner ends. These bushing seats are non-circular, being preferably slot-like, as shown, their longitudinal sides being parallel. The diameter of the opening of the seats is equal to their greatest diameter, so that the bushings 10, which are of such cross section as to fit the seats, may be introduced laterally.

The journal member 11 is provided with journals 12, preferably formed integral therewith. The bushings are provided with grooves 13 in their outer face, while the shaft members have bores 14 alined with these grooves when the bushings are in place to receive the retaining pins 15. These pins serve to retain the bushings against lateral and longitudinal movement in the seats. As the bushings are non-circular in cross section they are supported against rotative movement. More or less difficulty has been experienced in effectively retaining circular bushings in their seats so that they do not become loosened or rotate, particularly where the joint is not properly supplied with lubricant.

By forming the parts as I have described, they may be economically produced, readily assembled and disassembled, and the structure is strong and durable.

I preferably provide a shell-like casing 16 adapted to seat in the groove 17 formed in the face of the part 5. The outer end of this casing is spherically curved at 18 so that the gasket or packing 19 carried by the cap 20 rides on this surface as the joint is flexed. The cap member 20 is slidably mounted on the shaft member 2 and is yieldingly supported by the spring 21, the outer end of which rests against the retaining ring 22. This retaining ring is formed of sections 23 and 24 secured at one side by the pivot 25 so as to overlap at the other side, the overlapping parts being provided with a keeper 26 and coacting catch lug 27. This ring fits into an annular groove 28 provided therefor in the shaft member 1. The ring is quite secure when its keeper and catch members are engaged, but when engaged in the groove and subjected to pressure of the spring 21, it is quite impossible for it to become accidentally disengaged. However, it is readily released and engaged as occasion requires. The housing member 16 has a lug 29 formed therein to engage with the groove 30 in the arms 8.

I have illustrated and described my improvements in one form in which I have embodied the same. I have not attempted to illustrate or describe various modifications in structural details which are possible and might be desirable under certain conditions, as I believe the disclosure made will enable those skilled in the art to which my invention relates to embody or adapt the same as may be desired.

Having thus described my invention, what I claim as new and desire to secure by Letters Patent, is:

1. In a universal joint, the combination of shaft members having slot-like bushing seats extending longitudinally from the outer ends of their arms, the longitudinal sides of the seats being parallel, a journal member provided with fixed journals disposed at right angles and extending into said seats, flat sided bushings disposed in said seats and adapted to be introduced and removed therefrom laterally, said bushings having transverse grooves in their outer sides, said shaft member arms having bores alined with said grooves, and pins disposed in said bores to engage said grooves whereby the bushings are retained against lateral and longitudinal movement.

2. In a universal joint, the combination of a pair of shaft members having arms provided with bushing seats of non-circular cross section open at one side, the opening of the seats being equal to their greatest diameter so that bushings may be introduced laterally thereto, a journal member provided with fixed journals and extending into said seats, bushings conformed in cross section to said seats so that they are held against rotative movement, the outer sides of said bushings being transversely grooved, said shaft members having bores alined with said grooves when said bushings are in position, and pins disposed in said bores to engage said grooves whereby said bushings are supported against lateral and longitudinal movements.

In witness whereof, I have hereunto set my hand and seal in the presence of two witnesses.

BERT O. RHODES. [L. S.]

Witnesses:
J. WESLEY BEAN,
FLORENCE SOUDRIETTE.